(12) United States Patent
Jafarian (10) Patent No.: US 9,775,117 B1
(45) Date of Patent: Sep. 26, 2017

(54) DYNAMIC CLEAR CHANNEL ASSESSMENT

(71) Applicant: NEWRACOM, INC., Irvine, CA (US)

(72) Inventor: Amin Jafarian, Princeton, NJ (US)

(73) Assignee: NEWRACOM, INC., Irvine, CA (US)

( * ) Notice: Subject to any disclaimer, the term of this patent is extended or adjusted under 35 U.S.C. 154(b) by 80 days.

(21) Appl. No.: 14/868,209

(22) Filed: Sep. 28, 2015

Related U.S. Application Data (60) Provisional application No. 62/056,146, filed on Sep. 26, 2014, provisional application No. 62/128,435, filed on Mar. 4, 2015.

(51) Int. Cl.
  *H04W 52/24* (2009.01)
  *H04L 12/911* (2013.01)
  *H04W 72/08* (2009.01)

(52) U.S. Cl.
  CPC ......... *H04W 52/248* (2013.01); *H04L 47/822* (2013.01); *H04W 72/082* (2013.01)

(58) Field of Classification Search
  None
  See application file for complete search history.

(56) References Cited

U.S. PATENT DOCUMENTS

| | | | | |
|---|---|---|---|---|
| 7,043,751 | B1* | 5/2006 | Fischer | H04M 3/4228 726/4 |
| 2011/0255462 | A1* | 10/2011 | Jo | H04B 7/2606 370/315 |
| 2013/0017794 | A1* | 1/2013 | Kloper | H04W 74/0808 455/63.1 |
| 2013/0244715 | A1* | 9/2013 | Kwon | H04W 52/242 455/522 |
| 2013/0322279 | A1* | 12/2013 | Chincholi | H04W 24/10 370/252 |
| 2016/0037530 | A1* | 2/2016 | Peng | H04W 24/06 370/329 |

* cited by examiner

*Primary Examiner* — Kodzovi Acolatse (57) ABSTRACT

A first device determines a maximum allowable interference, and transmits a packet including an indicator of the maximum allowable interference. The maximum allowable interference corresponds to an amount of interference that can be present at the first device without preventing proper reception, by the first device, of packets from a second device, or to an amount of interference that can be present at the first device without resulting in a reduction in a Modulation and Coding Scheme of communications between the first and second device. A secondary transmitting device receives an indication of a maximum allowable interference, determines a maximum transmission power according to the maximum allowable interference, and transmits packets during a NAV protection period at a transmission power less than or equal to the maximum transmission power, when the NAV protection period does not reserve the medium the secondary transmitting device.

17 Claims, 5 Drawing Sheets

DYNAMIC CLEAR CHANNEL ASSESSMENT

CROSS-REFERENCE TO RELATED APPLICATION

This application claims priority to and the benefit of U.S. Provisional Application No. 62/056,146, filed on Sep. 26, 2014, and U.S. Provisional Application No. 62/128,435, filed on Mar. 4, 2015, the entire contents of both of which are incorporated herein by reference.

BACKGROUND

1. Technical Field

The technology described herein relates generally to wireless networking. More particularly, the technology relates generally to determination of when a transmitting device of a wireless network may transmit using a process known as Clear Channel Assessment (CCA).

2. Description of the Related Art

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (hereinafter, IEEE 802.11). The IEEE Std 802.11™-2012 was subsequently amended by IEEE Std 802.11ae™-2012, IEEE Std 802.11aa™-2012, IEEE Std 802.11ad™-2012, and IEEE Std 802.11ac™-2013 (hereinafter, IEEE 802.11ac). These standards are each hereby incorporated by reference herein in their entirety.

In 802.11, CCA is performed by a transmitting device. When a station (STA) wants to transmit a packet, it checks for RF energy in the medium and performs CCA to ensure that there is not any other STA transmitting a packet. As part of CCA, the station may check a Network Allocation Vector (NAV) sent as part of a prior transmission from another station. The NAV indicates a period of time when the other station is using the medium either to send or to receive packets.

However, CCA performed as described above may prevent the medium from being used to its full capacity. Accordingly, a process for determining whether a first transmitting device can communicate with a first receiving device without interfering with contemporaneous communications between a second transmitting device and a second receiving device is desired.

SUMMARY

A method for controlling access to a medium in a wireless communication system comprises determining, by a first device, a maximum allowable interference, and transmitting a packet including an indicator of the maximum allowable interference. The maximum allowable interference corresponds to an amount of interference that can be present at the first device without preventing proper reception, by the first device, of packets from a second device, or to an amount of interference that can be present at the first device without resulting in a reduction in a current Modulation and Coding Scheme (MCS) of communications between the first and second device.

In an embodiment, the first device is a receiving device and determining the maximum allowable interference comprises determining one or more of a maximum modulation and coding scheme (MCS) for transmissions from the second device to the first device and a minimum transmission power for the transmissions, and determining the maximum allowable interference according to one or more of the maximum MCS and the minimum transmission power.

In an embodiment, the packet further includes an indication of a duration of a Network Allocation Vector (NAV) protection period.

In an embodiment, the method further comprises receiving an indication of a maximum allowable interference by a transmitting device and determining a maximum transmission power according to the maximum allowable interference.

In an embodiment, the packet further includes one or more of an indication of a transmission power used to transmit the packet and an indication of a location of the first device.

In an embodiment, the method further comprises determining a Clear Channel Assessment (CCA) threshold according to the maximum allowable interference.

In an embodiment, the packet is a Clear to Send (CTS) packet.

In an embodiment, the indicator of the maximum allowable interference is included in a signal (SIG) field of the packet.

In an embodiment, the first device performs the method during a first sub-interval of a beacon interval, and the first device does not perform the method during a second sub-interval of the beacon interval.

A method for controlling access to a medium in a wireless communication system comprises receiving, by a secondary transmitting device, an indication of a maximum allowable interference and determining a maximum transmission power according to the maximum allowable interference. The maximum allowable interference corresponds to an amount of interference that can be present at a primary receiving device without preventing proper reception, by the primary receiving device, of packets from a primary transmitting device, or to an amount of interference that can be present at the primary receiving device without resulting in a reduction in a current Modulation and Coding Scheme (MCS) of communications between the primary transmitting device and primary receiving device.

In an embodiment, the indication of a maximum allowable interference is received in a packet transmitted by the primary receiving device.

In an embodiment, the packet is a Clear-to-Send (CTS) packet.

In an embodiment, the method further comprises transmitting a cross-Ready-to-Send (XRTS) packet to a secondary receiving device after receiving the packet transmitted by the primary receiving device. The XRTS packet includes an indication of a time of a RTS/CTS exchange of the primary receiving device and an indication of a duration of a Network Allocation Vector (NAV) protection period.

In an embodiment, the method further comprises performing communications with the secondary receiving device when a cross-Clear-To-Send (XCTS) packet has been received from the secondary receiving device.

In an embodiment, the method further comprises receiving an indication of a duration of a Network Allocation Vector (NAV) protection period, and transmitting packets during the NAV protection period at a transmission power less than or equal to the maximum transmission power. The NAV protection period does not reserve the medium for use by the secondary transmitting device.

In an embodiment, determining the maximum transmission power comprises determining one or more characteristics of a channel between the secondary transmitting device and the primary receiving device, and determining the maximum transmission power at which a packet transmitted at the maximum transmission power has a power level after propagating through the channel that is less than or equal to the maximum allowable interference.

In an embodiment, the determining the one or more characteristics of the channel includes determining an attenuation of the channel according to one or more of a distance between the transmitting the device and the primary receiving device, a transmission power of a packet transmitted by the primary receiving device, and a measurement of a power level of the packet transmitted by the primary receiving device.

In an embodiment, the method further comprises determining a minimum transmission power for communicating with a secondary receiving device and determining whether to perform communications with the secondary receiving device according to a comparison of the minimum transmission power and the maximum transmission power.

In an embodiment, the method further comprises determining whether to perform communications according to a comparison of a number generated by a random or pseudo-random number generator with a threshold.

DETAILED DESCRIPTION

Embodiments of the present disclosure relate generally to wireless networking, and more particularly, to determination of when a transmitting device of a wireless network may transmit using a process known as Clear Channel Assessment (CCA).

In the following detailed description, certain illustrative embodiments have been illustrated and described. As those skilled in the art would realize, the described embodiments may be modified in various different ways without departing from the spirit or scope of the present disclosure. Accordingly, the drawings and description are to be regarded as illustrative in nature and not restrictive. Like reference numerals designate like elements in the specification.

As used herein, a transmitting device is a device having data, control, or management information to deliver, and a receiving device is a device that the information will be delivered to. As part of the process of delivering the information, each of the transmitting device and the receiving device may transmit packets and may receive packets. For example, a receiving device may transmit Clear-to-Send (CTS) and/or Acknowledgment (ACK) packets in response to packets transmitted by the transmitting device, and the transmitting device may receive the CTS and/or ACK packets.

IEEE 802.11 incorporates Clear Channel Assessment (CCA) using a Network Allocation Vector (NAV). The NAV is a virtual carrier-sensing mechanism that limits the need for physical carrier-sensing and addresses the hidden node problem.

A duration field of a packet may specify a time period (herein referred to as a NAV protection period) when the medium is presumed to be in use by one or more wireless devices that established the NAV protection period. In some wireless networks, a wireless device that receives a packet containing such a duration field, including devices for which the packet is not intended but not including the devices that established the NAV protection period, extracts the value of the duration field and forbears from transmitting during the interval indicated by the corresponding NAV protection period.

Figure 1:
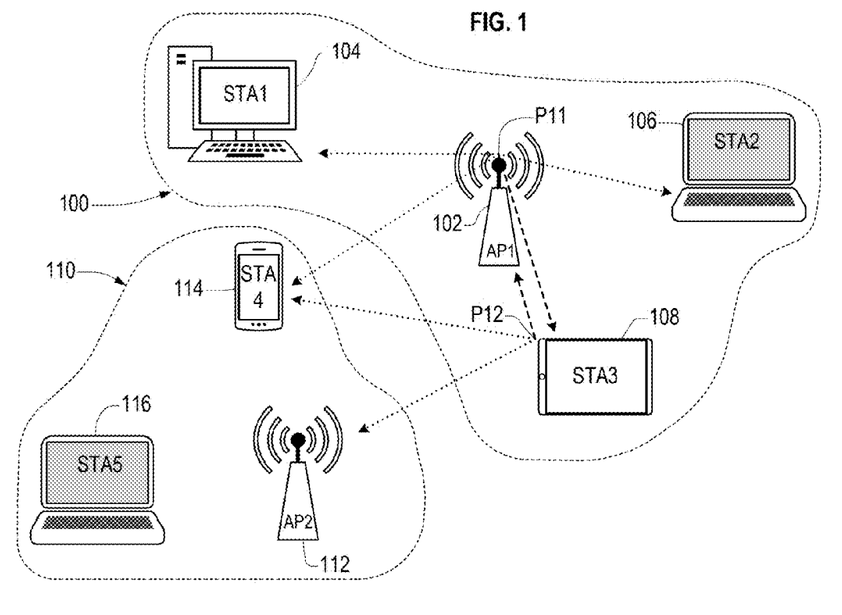
FIG. 1 illustrates wireless networks and a first set of communications therein.

FIG. 1 shows first and second wireless networks and communications therein. The communications include first and second packets P11 and P12 including respective NAV-related information.

The first wireless network includes a first infrastructure Basic Service Set (BSS) 100 of a Wireless Local Area Network (WLAN). In an IEEE 802.11 wireless LAN, the BSS provides the basic building-block and may include an Access Point (AP) and one or more associated stations (STAs). In FIG. 1, the BSS 100 includes a first Access Point 102 associated and wirelessly communicating with a plurality of wireless devices (or stations) 104, 106, and 108 (also referred to as AP1 and STA1, STA2, and STA3, respectively). The WLAN device may include a medium access control layer (MAC) and a physical layer (PHY) according to the IEEE Std 802.11.

The first AP AP1 is a station, that is, a STA, configured to control and coordinate functions of the BSS 100. The first AP AP1 may transmit information to a single station selected from the plurality of stations STA1 to STA3 in the BSS 100 using a single frame, or simultaneously transmit information to two or more (e.g., to all three) stations STA1 to STA3 in the BSS 100 using, for example, one of an Orthogonal Frequency Division Multiplexing (OFDM) broadcast frame, a single OFDM Multi-User Multi-Input-Multi-Output (MU-MIMO) transmission, and the like.

The stations STA1 to STA3 may transmit data to the first AP AP1 using a single frame, or transmit information to and receive information from another one of the stations STA1 to STA3 using a single frame.

Each of the stations STA1 to STA3 and the first AP AP1 includes a processor and a transceiver, and may further include a user interface and a display device. The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network. The transceiver may be defined using a single component that performs the functions of transmitting and receiving, or two separate components each performing one of such functions.

An AP may include a WLAN router, a stand-alone Access Point, a WLAN bridge, a Light-Weight Access Point (LWAP) managed by a WLAN controller, and the like. In addition, a station such as a personal computer or cellular phone may be able to operate as an access point, such as when a cellular phone is configured to operate as a wireless "hot spot."

A station may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

The second wireless network includes a second infrastructure Basic Service Set (BSS) 110 of a WLAN. The BSS 110 includes a second AP 112 associated and wirelessly communicating with a plurality of wireless devices (or stations) 114 and 116 (also referred to as AP2, STA4, and STA5, respectively).

The second BSS 110, AP2, STA4, and STA5 are substantially similar to and operate in substantially the same manner as the first BSS 100, AP1, STA1, STA2, and STA3, and therefore further description of the second BSS 110, AP2, STA4, and STA5 is omitted in the interest of brevity.

Figure 2:
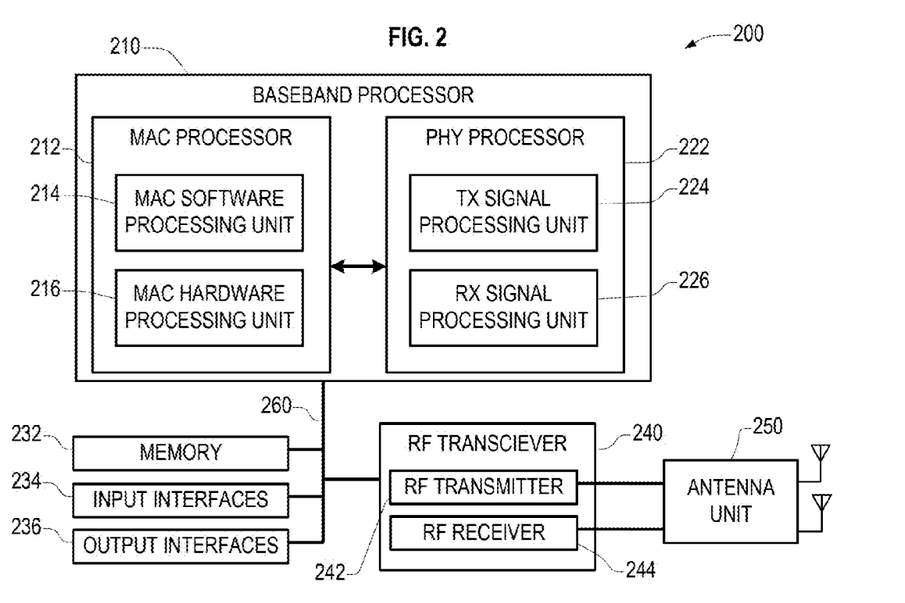
FIG. 2 illustrates a schematic block diagram of a wireless device according to an embodiment.

FIG. 2 illustrates a schematic block diagram of a wireless device 200 according to an embodiment. The wireless or WLAN device 200 can represent any device in a BSS, e.g., first AP AP1, second AP AP2, or any of stations STA1 to STA5 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222.

In an embodiment, the MAC processor 212 includes a MAC software processing unit 214 and a MAC hardware processing unit 216. The storage device (or memory) 232 may be a non-transitory computer readable medium that stores software (e.g., computer programing instructions) hereinafter referred to as "MAC software". The MAC software processing unit 214 executes the MAC software to implement a first plurality of functions of the MAC layer. The MAC hardware processing unit 216 may implement a second plurality of functions of the MAC layer in special-purpose hardware, hereinafter referred to "MAC hardware." However, the MAC processor 212 is not limited thereto. For example, the MAC processor 212 may be configured to perform the first and second plurality of functions entirely in software or entirely in hardware according to implementation.

The PHY processor 222 includes a transmitting signal processing unit 224 and a receiving signal processing unit 226. The PHY processor 222 implement a plurality of functions of the PHY layer. These functions may be performed in software, hardware, or a combination thereof according to implementation. In an embodiment, the PHY processor 222 may be configured to generate channel state information (CSI) according to information received from the RF transceiver 240.

The channel state information (CSI) may include one or more of a Received Signal Strength Indication (RSSI), a Signal to Interference and Noise Ratio (SINR), a Modulation and Coding Scheme (MCS), and a Number of Spatial Streams (NSS). CSI may be generated for one or more of a frequency block, a sub-band within the frequency block, a subcarrier within a frequency block, a receiving antenna, a transmitting antenna, and combinations of a plurality thereof.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software, and which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3:
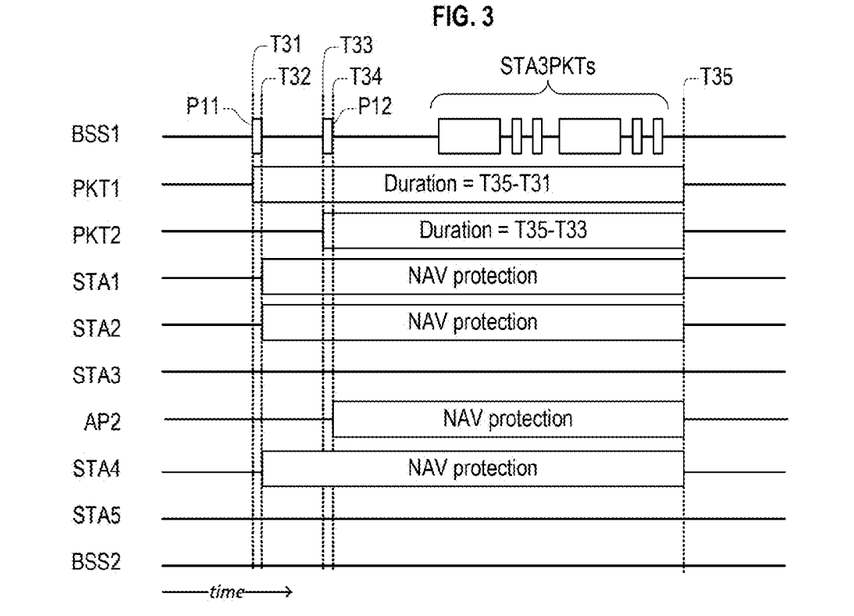
FIG. 3 illustrates details of the first communications shown in FIG. 1.

FIG. 3 illustrates an operation of the first and second BSS 100 and 110 of FIG. 1 according to an embodiment. In particular, FIG. 3 illustrates the operation of virtual carrier sensing using Network Allocation Vectors (NAVs).

In the illustrative examples provided herein, it is assumed that all of the devices that are transmitting and receiving are doing so within a same frequency band, such that a potential for interference between simultaneous transmissions exists. In a system based on the IEEE Std 802.11, for example, the frequency band may be a 20 MHz, 40 MHz, 80 MHz or 80+80 Mhz band, and may be a primary or a secondary band.

At a first time T31, the first AP AP1 of the first BSS 100 transmits a first packet P11. In an embodiment, the first packet P11 may be a Ready-to-Send (RTS) packet. In an embodiment, the AP AP1 transmits the first packet P11 after determining that no other device is using or scheduled to use the medium, which may include sensing the amount of energy in the medium.

The first packet P11 is addressed to the third station STA3, but is received by all of the stations associated with the AP1 (stations STA1, STA2, and STA3). In the example shown, because the fourth station STA4, which is part of the second BSS 110, is in proximity to the AP AP1, the fourth station STA4 also receives the first packet P11.

The first packet P11 has a Duration/ID field having a value which, in this case, indicates a duration of protection, that is, a reservation of the medium, provided for one or more subsequent packets, such as described in §9.3.1 et seq. of IEEE Std 802.11™-2012. The protection is against transmissions by other devices. The value of the Duration/ID field indicates a duration, e.g., in microseconds of the protection. In the example of FIG. 3, the Duration/ID field of the first packet P11 has a value equal to a difference between a fifth time T35 and the first time T31, indicating that the protection extends to the fifth time T35.

Each station that receives the first packet P11 updates its Network Allocation Vector (NAV) according to the value of Duration/ID field of the first packet P11, except for the station to which the first packet P11 is addressed (that is, except for the third station STA3). The NAV is updated when the NAV protection period indicated by the Duration/ID field of the first packet P11 extends beyond a NAV protection period currently indicated by the value of the NAV.

Accordingly, at a second time T32, the first, second, and fourth stations STA1, STA2, and STA4 each updates its NAV to indicate a NAV protection period extending until the fifth time T35. When operating according to some WLAN standards, such as IEEE Std 802.11-2012, the first, second, and fourth stations STA1, STA2, and STA4 will not transmit while their respect NAVs indicate that protection is being provided.

At a third time T33, the third station STA3 responds to the first packet P11 by transmitting a second packet P12. In an embodiment, the second packet P11 may be a Clear-to-Send (CTS) packet.

The second packet P12 is addressed to the first AP AP1, but is also received by the second AP AP2 and the fourth station STA4 of the second BSS 110.

The second packet P12 has a Duration/ID field having a value that, in this case, indicates a duration of a NAV protection period that lasts until the fifth time T35. Accordingly, at a fourth time T34, the second AP AP2 updates its NAV to indicate a NAV protection period extending until the fifth time T35. Because the NAV of the fourth station STA4 already indicates that the NAV protection period extends to the fifth time T35, the fourth station STA4 need not update its NAV.

During the NAV protection period, the first AP AP1 and the third station STA3 communicate by exchanging a plurality of packets STA3PKTS. The protection provided according to the NAVs improves the efficiency of the communication between the first AP AP1 and the third station STA3 by eliminating the possibility of collisions between the packets STA3PKTS and transmissions from the first, second, and fourth stations STA1, STA2, and STA4 and the second AP AP2.

However, the present disclosure recognizes that the requirement that no station transmit during the NAV protection period may be unnecessary in certain situations and may prevent full utilization of the medium. Instead, a station should not be prohibited from transmitting during the NAV protection period if the station can guarantee that its transmission will not interfere with the transmissions protected by the NAV protection period.

Because the medium used by a wireless network will always include some amount of noise and interference, communications in the wireless network are adapted to operate in (that is, tolerate) the presence of that noise and interference. The present disclosure recognizes that if a second transmission has a power at a receiving device of a first transmission that produces less noise and interference than the receiving device is adapted to tolerate, the second transmission will not meaningfully interfere with the first transmission.

Before a device such as an AP or a station transmits, the device may sense whether any other device is using the medium. The sensing is performed by determining an amount of energy in the bandwidth that will be used for transmission. If the amount of energy is less than a predetermined CCA threshold, the device will determine that the medium is available for use by the device.

The CCA threshold may vary according to a channel spacing and whether a valid wireless network transmission is detected. For example, §18.3.10.6 of IEEE Std 802.11™-2012 specifies a CCA threshold of −82 dBm (that is, 82 decibels below 1 milliwatt) for a 20 MHz channel spacing, −85 dBm for a 10 MHz channel spacing, and −88 dBm for a 5 MHz channel spacing when a start of a valid Orthogonal Frequency Division Multiplexing (OFDM) transmission is received, and a CCA threshold of −62 dBm for the 20 MHz channel spacing, −65 dBm for the 10 MHz channel spacing, and −68 dBm for the 5 MHz channel spacing otherwise.

In an environment in which a plurality of transmitting devices that are in proximity to each other all have packets to transmit to a plurality of respective receiving devices, the CCA threshold may determine an efficiency of use of the medium. A lower CCA threshold, such as a −82 dBm threshold, may prevent some simultaneous transmissions that would not interfere with each other. Accordingly, a higher CCA threshold, such as a CCA threshold of −72 dbm, may permit more efficient use of the medium.

Because signals below a threshold are not sensed as occupying the medium during CCA, and because wireless network communications are adapted to tolerate noise, a transmission by a first device would not prevent a second and third device from communicating when a power level of the transmission, as measured at one or more of the second and third devices, is less than a threshold even when a NAV of the first device indicates that protection is being provided to communications between the second and third device. Therefore, a first device embodying the present disclosure may transmit when the first device can determine that the transmission will have a power as measured at one or more of the second and third devices that is below a threshold value even when the NAV of the first device indicates that protection is being provided to communications between the second and third device.

Figure 4:
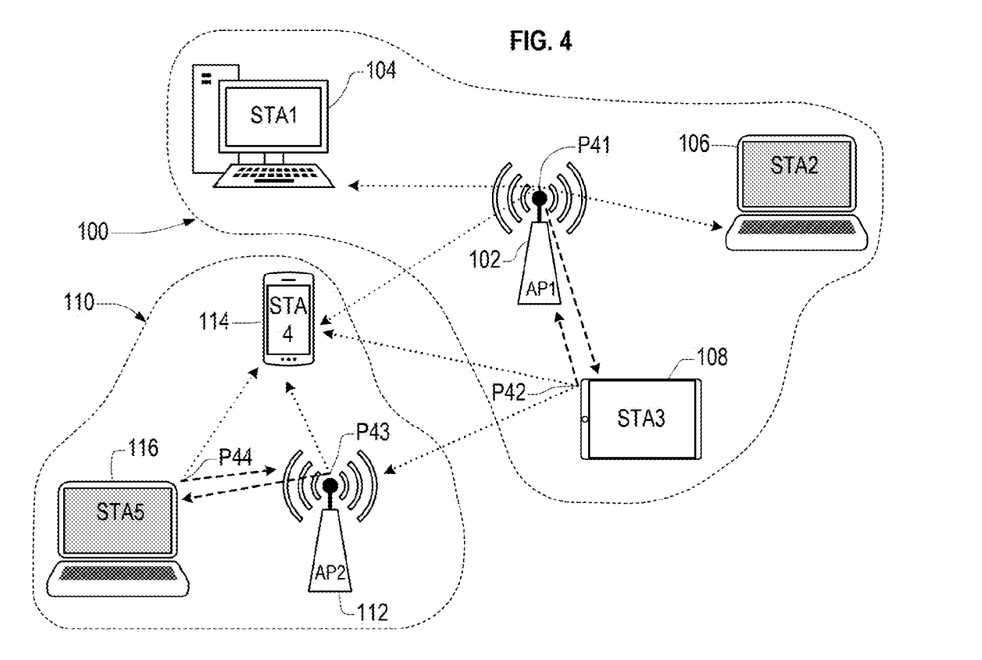
FIG. 4 illustrates wireless networks and a second set of communications therein according to an embodiment.
Figure 5:
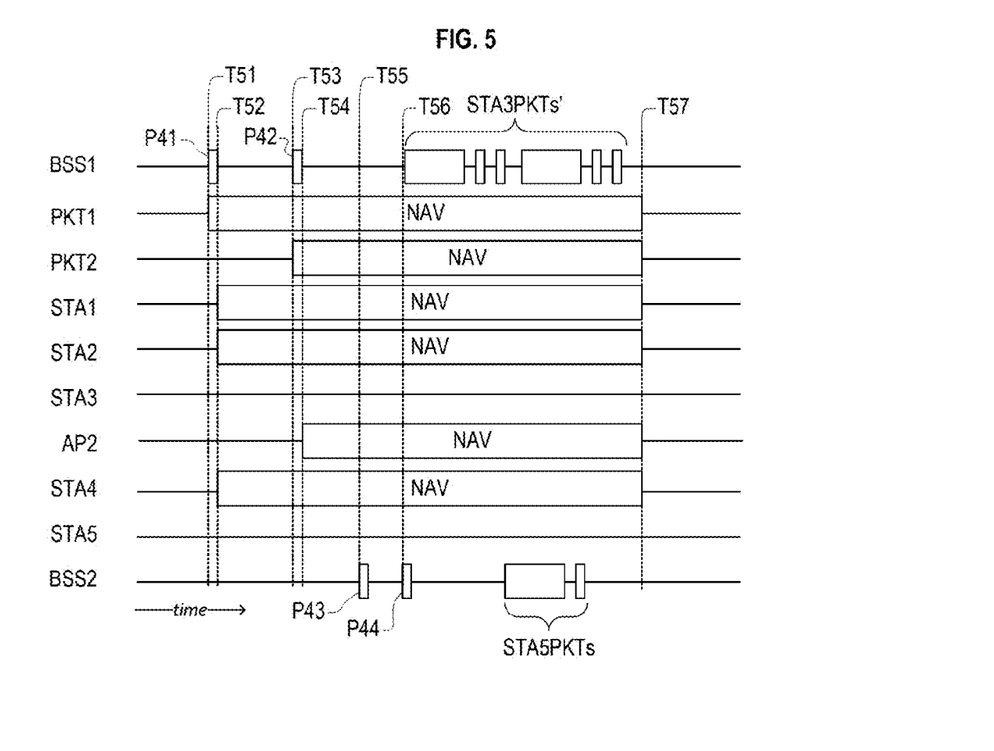
FIG. 5 illustrates details of the second communications shown in FIG. 4 according to an embodiment.

FIG. 4 illustrates the first BSS 100 and a second BSS 110 of FIG. 1 and shows communications between the second AP AP2 and the fifth station STA5 during a protection period for communications between the first AP AP1 and the third station STA3 according to an embodiment. FIG. 5 illustrates details of the communications.

In the example of FIGS. 4 and 5, the first AP AP1 and the third station STA3, which communicate under the protection of a NAV during the NAV protection period, are termed a primary pair, with the first AP AP1 which transmits data, management, and/or control packets to the STA3 being termed a primary transmitting device, and the third station STA3 which may only transmit, for example, Acknowledgement (ACK) packets, Block Acknowledgement (BA) packets, and the like being termed a primary receiving device.

The second AP AP2 and the fifth station STA5, which may perform non-interfering communications during the NAV protection period when doing so does not interfere with communications of the primary pair, are termed a secondary pair, with the second AP AP2 being a secondary transmitting device, and the fifth station STA5 being a secondary receiving device.

At a first time T51, the first AP AP1 of the first BSS 100 transmits a first packet P41. In an embodiment, the first packet P41 may be a Ready-to-Send (RTS) packet. In an embodiment, the AP AP1 transmits the first packet P41 after determining that no other device is using or scheduled to use the medium, which may include sensing the amount of energy in the medium.

The first packet P41 is addressed to the third station STA3, but is received by all of the stations associated with the AP1 (stations STA1, STA2, and STA3) and by the near-by fourth station STA4 of the second BSS 110.

The first packet P41 has a Duration/ID field having an value which, in this case, indicates a reservation of the medium for the NAV protection period, which provides protection for one or more subsequent packets sent between the primary pair, as described in §9.3.1 et seq. of IEEE Std 802.11™-2012. In the example of FIG. 5, the Duration/ID field of the first packet P41 has a value equal to a difference between a seventh time T57 and the first time T51, indicating that the NAV protection period extends to the seventh time T57.

Each station that receives the first packet P41 may update its Network Allocation Vector (NAV) according to the value of Duration/ID field of the first packet P41, except for the station to which the first packet P41 is addressed (that is, except for the third station STA3). Each NAV is updated when the protection period indicated by the Duration/ID field of the first packet P41 extends beyond a NAV protection period currently indicated by the NAV.

Accordingly, at a second time T52, the first, second, and fourth stations STA1, STA2, and STA4 each update their NAV to indicate a NAV protection period extending until the fifth time T35.

After the first packet is received by the third station STA3, the first AP AP1 and the third station STA3 have committed to a maximum Modulation and Coding Scheme (MCS) and a minimum transmission power that will be used in subsequent communications between the first AP AP1 and the third station STA3, wherein the maximum MCS includes an MCS and a number of spatial streams, and the STA3 is committed to not exceed that MCS and that number of spatial streams in the subsequent communications. Using the MCS, the minimum transmission power, and information on the channel characteristics between the first AP AP1 and the third station STA3, the third station STA3 determines a maximum allowable interference.

In an embodiment, the maximum allowable interference is an amount of interference that can be present at the third station STA3 without preventing proper reception of packets from the first AP AP1 by the third station STA3.

In an embodiment, the maximum allowable interference is an amount of interference that can be present at the third station STA3 without resulting in a reduction in the current MCS of communication between the first AP AP1 and the third station STA3.

At a third time T53, the third station STA3 responds to the first packet P41 by transmitting a second packet P42. In an embodiment, the second packet P42 may be a Clear-to-Send (CTS) packet. The second packet P42 is addressed to the first AP AP1, but is also received by the second AP AP2 and the fourth station STA4.

The second packet P42 has a Duration/ID field having a value that, in this case, indicates a duration of protection extending until the seventh time T57. Accordingly, at a fourth time T54, the second AP AP2 updates its NAV to indicate a NAV protection period extending until the seventh time T57. Because the NAV of the fourth station STA4 already indicates that protection is provided until the seventh time T57, the fourth station STA4 does not update its NAV.

The second packet P42 also includes receiver-side CCA (RSCCA) information adapted to informs other devices, other than the first AP AP1, of how clear the channel needs to be (that is, of a maximum amount of noise and interference that can be in the channel) for the third station STA3 to reliably receive packets from the first AP AP1. The RSCCA information may include an indication of a maximum allowable interference. In an embodiment, the receiver-side CCA information may also include an indication of the transmission power used to transmit the second packet P42. In another embodiment, the second packet P42 is transmitted using a predetermined transmission power that is known to the other wireless devices in a vicinity of the third station STA3.

After receiving the second packet P42, the second AP AP2 determines a maximum transmission power for packets sent by the second AP AP2 that will produce less than the maximum allowable interference at the third station STA3. The determination of the maximum transmission power is made according to the maximum allowable interference indication included in the second packet P42 and a determination of the channel characteristics between the second AP AP2 and the third station STA3. Specifically, the second AP2 will determine the maximum transmission power at which packets have a power level after propagating through the channel between the second AP AP2 and the third station STA3 that is less than or equal to the maximum allowable interference.

The determination of the channel characteristics between the second AP AP2 and the third station STA3 may include an estimate of the attenuation that packets will be subject to during propagation between the second AP AP2 and the third station STA3.

In an embodiment, the estimate of the attenuation may be made based on a Received Signal Strength Indicator (RSSI) of a packet received by the second AP AP2 from the third station STA3 and an indication of the transmission power used to transmit the received packet. In an embodiment, the indication of the transmission power is included in the received packet.

In another embodiment, the estimate of the attenuation may be made based on information about the location of the third station STA3 relative to the second AP AP2. For example, the estimate of the attenuation may be made according to the square of the distance between the third station STA3 and the second AP AP2 times a predetermined constant, or the estimate of the attenuation may be determined according to a predetermined number of decibels of attenuation per a unit distance.

The determination of the maximum transmission power may also use information regarding the directional properties of one or more antennas of the second AP AP2 and information about geographical locations, relative to the second AP AP2, of one or more of the third station STA3 rand the first AP AP1. For example, if the AP AP2 has one or more antennas configured such that the third station STA3 is positioned between lobes or in a minor lobe of a radiation pattern of the one or more antennas, such that a power of a signal transmitted by the AP AP2 in the direction of the third station STA3 is reduced, the maximum transmission power may be increased according to the reduction of the power of the signal transmitted in the direction of the third station STA3.

In an embodiment, the channel characteristics between the second AP AP2 and the third station STA3 may have been determined at a time prior to the reception of the second packet P42 by the second AP AP2. In an embodiment, the channel characteristics between the second AP AP2 and the third station STA3 may be determined using one or more prior packets transmitted by the third station STA3.

At a fifth time T55, the second AP AP2 transmits a third packet P43 to the fifth station STA5 when a determination has been made that the second AP AP2 can communicate with the fifth station STA5 without interfering with the communications between the devices protected by the NAV, that is, the first AP AP1 and the third station STA3. The determination may include determining that a transmission power sufficient for communicating with the fifth station STA5 will not produce interference at the third station STA3 that is greater than the maximum allowable interference.

The second AP AP2 transmits the third packet P43 even though the NAV of the AP AP2 indicates that the medium is reserved. In embodiment, the second AP AP2 transmits the third packet P43 even though an amount of energy sensed in the channel exceeds a CCA threshold of the second AP AP2. The transmission of the third packet P43 may be adapted to not interfere with the communications between the devices protected by the NAV by one or more of reducing a transmission power of the third packet P43, beamforming the transmission of the third packet P43, and the like.

In an embodiment, the third packet P43 may be a RTS packet. In another embodiment, the third packet P43 may be a cross-RTS (XRTS) packet including additional information not present in a RTS packet, as shall be described below.

The third packet P43 may include a Duration/ID field like that found the first packet P41. The fourth station STA4 may update its NAV when receiving the third packet P43 if the Duration/ID field of the third packet P43 indicates that protection should extend further than already indicated by its NAV, that is, beyond the seventh time T57.

Because the third packet P43 is transmitted when its transmission is adapted to not interfere with communications from the first AP AP1 to the third station STA3, the third station STA3 does not receive the third packet P43.

In an embodiment, the third packet P43 includes a cross RTS (XRTS) frame indicating that there is an active RTS/CTS exchange being performed by the first AP AP1 and the third station STA3, that is, by the primary pair of devices.

The XRTS frame includes an indication that the frame is an XRTS frame, one or more RTS/CTS time pointers, and a NAV duration counter.

In an embodiment, the one or more RTS/CTS time pointers indicate a time of reception by the second AP AP2 of an RTS packet transmitted by the first AP AP1, or a time of reception by the second AP AP2 of a CTS packet transmitted by the third station STA3, or both.

In an embodiment, the one or more RTS/CTS time pointers may only indicate a time of reception by the second AP AP2 of a single packet, which may be an RTS or CTS packet. In an embodiment, the XRTS frame includes an indication of whether the time of reception was of an RTS packet or a CTS packet.

The NAV duration counter indicates the end of the NAV protection period established by the RTS and CTS packets of the primary pair of devices.

The second AP AP2 transmits the XRTS frame is such a way that the interference produced by the transmission at the third station STA3 is less than a noise floor. In an embodiment, the noise floor is a previously determined maximum allowable interference or a maximum allowable interference indicated in a received frame of the active RTS/CTS exchange of the primary pair of devices.

In an embodiment, when the second AP AP2 receives an RTS packet but not a CTS packet, the second AP AP2 may determine the transmission power of the CTS packet and broadcast the XRTS frame at a power level less than the determined power of the CTS packet. In an embodiment, the power used to transmit the CTS packet may be indicated in the RTS packet or in a prior frame received by the second AP A2.

In an embodiment, when the second AP AP2 receives the CTS packet at a low power level and determines the transmission power of the CTS packet, the second AP AP2 can determine a power level for transmitting the XRTS frame that will produce interference below the noise floor at the third station STA3. In an embodiment, the power used to transmit the CTS packet may be indicated in the CTS packet, the RTS packet, or in a prior frame received by the second AP A2.

In an embodiment, the second AP AP2 transmits a plurality of XRTS frames during the NAV protection period.

At a sixth time T56, the fifth station STA5 responds to the third packet P44 by transmitting a fourth packet P44 to the second AP AP2. In the example shown, wherein the fifth station STA5 does not receive either of the first packet P41 and the second packet P42, transmissions between the fifth station STA5 are sufficiently attenuated by the medium that they are not received by and do not interfere with communications between the first AP AP1 and the third station STA3.

When the third packet P43 includes an XRTS frame, the fourth packet P44 may include a cross-CTS (XCTS) frame. When the fourth packet P44 includes an XCTS frame, the fifth station transmits the fourth packet P44 when the fifth station STA5 was awake sensing the medium during the RTS/CTS time indicated in the XRTS frame and either 1) the fifth station STA5 did not receive the CTS packet and can estimate the transmission power used to transmit the CTS packet, or 2) the fifth station STA5 did receive the CTS packet and can therefor determine a transmission power that will not interfere with reception of communications from the first AP AP1 to the third station STA3.

The fifth station STA5 transmit the XCTS frame after a random back-off of no more than 16 slot times, which slot times in an IEEE 802.11 network may each be, for example, 9 or 20 microseconds. The fifth station STA5 may determine to not transmit the fourth packet P44 including the XCTS frame when the fifth station STA5 determines that communications cannot be successfully conducted with the second AP AP2 during the NAV protection period within the constraints imposed by the RSCCA.

The fourth station STA4 and any other stations in the second BSS 110 respond to an XRTS frame in the manner described for the fifth station STA5.

The second AP AP2 transmits an ACK or data frame within a short inter-frame space (SIFS) after receiving an XCTS frame.

During the NAV protection period, the first AP AP1 and the third station STA3 communicate by exchanging a plurality of packets STA3PKTS'. During the same NAV protection period, the second AP AP2 and the fifth station STA5 communicate by exchanging a plurality of packets STA5PKTS according to the constraints imposed by the RSCCA.

Communications between the first AP AP1 and the third station STA3 during the NAV protection period may include not only packets transmitted from the first AP AP1 to the third station STA3, but also return packets transmitted from the third station STA3 to the first AP AP1, such as Acknowledgement (ACK) and Block Acknowledgement (BA) packets, among others.

In an embodiment, the return packets have a low probability of being interfered with by transmissions from devices transmitting using the RSCCA process, and are therefore not protected using RSCCA. For example, the return packets may have a short duration and therefore may be unlikely to collide with another packet.

In another embodiment, to prevent interference with the return packets, the first AP AP1 may perform RSCCA determinations in the manner described for the third station STA3, and may transmit RSCCA information in the first packet P41 or some other packet. When the second AP AP2 receives packets including the RSCCA from both the third station STA3 and the first AP AP1, the second AP AP2 determines whether it can perform communications without interfering with the reception of packets at the third station STA3 and without interfering with the reception of packets at the first AP AP1.

For example, in an embodiment, the second AP AP2 may perform one or more of the following: 1) determine a first maximum transmission power that will not produce more than the maximum allowable interference at the third station STA3, 2) determine a second maximum transmission power that will not produce more than the maximum allowable interference at the first AP AP2, and 3) use the lesser of the first and second maximum transmission powers as the maximum transmission power for communications during the NAV protection period.

In an embodiment, when the station that the second AP AP2 has communications to perform during the NAV protection period with, for example, the fourth station STA4, and the fourth station STA4 will both receive packets from and send packets (such as ACK packets) to the second AP AP2, and the fourth station STA4 also receives packets including RSCCA information from the third station STA3, the first AP AP1, or both, then the fourth station STA4 will determine a maximum transmission power to use during the NAV protection period in the same manner as the second AP AP2.

When the second AP AP2 determines a maximum transmission power to use during the NAV protection period, and then determines that that maximum transmission power is too low to provide reliable communications with the station that is the target of the communications of the second AP AP2, the second AP AP2 may determine to not perform communications during the NAV protection period. Not performing communications during the NAV protection period may include not transmitting the third packet P43.

Similarly, when a station such as the fourth station STA4 determines a maximum transmission power to use during the NAV protection period, and then determines that that maximum transmission power is too low to provide reliable communications with the second AP AP2, the fourth station STA4 may determine not to perform communications during the NAV protection period. Not performing communications during the NAV protection period may include not responding to the third packet P43.

In an embodiment, when the second AP AP2 fails to receive a response to the third packet P43, the second AP AP2 will not perform any further communication during the current NAV protection period.

Although the illustrative examples above are presented in terms of APs communicating with stations, embodiments of the present disclosure are not limited thereto. Other embodiments may include WiFi-Direct and ad-hoc networks wherein one or more transmitting stations are substituted for one or more of the first and second APs AP1 and AP2.

Figure 6:
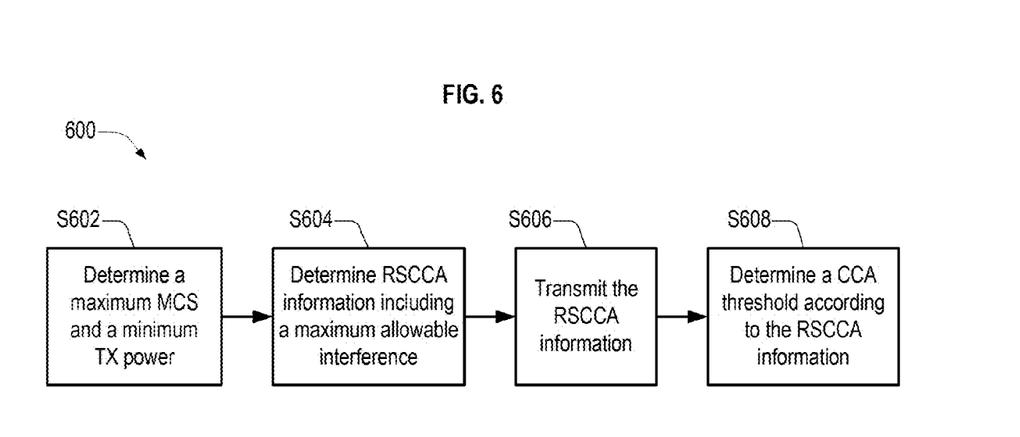
FIG. 6 illustrates a process for performing Receive-Side Clear Channel Assessment (RSCCA) in a Network Allocation Vector (NAV)-protected receiving device.

FIG. 6 illustrates a process 600 for performing Receive-Side Clear Channel Assessment (RSCCA) in a Network Allocation Vector (NAV)-protected receiving device, that is, in a primary receiving device of a primary pair of devices, according to an embodiment. In an embodiment, the process 600 may be performed using software or firmware executed by the MAC processor 212 of the WLAN device 200 of FIG. 2.

At S602, the primary receiving device determines a maximum Modulation and Coding Scheme (MCS) and a minimum transmission (TX) power for use during the current NAV protection period. The maximum MCS and the minimum TX power may be a maximum MCS and a minimum transmission power, respectively, of a transmitting device transmitting packets to the primary receiving device. In an embodiment, the transmitting device may be a primary transmitting device of the primary pair of devices.

The maximum MCS and the minimum TX power may be determined according to one or more of common MCS capabilities of the primary pair of devices, TX power capabilities of the transmitting device, a data rate of a communication, a maximum error rate of the communication, characteristics of the channel between the primary pair of devices, and the like. The maximum MCS and minimum TX power may be determined using measurements of or information in a packet received from the transmitting device, or both.

At S604, RSCCA information is determined using the maximum MCS and the minimum TX power. Determining the RSCCA information may also use information about the channel between the transmitting device and the primary receiving device, which may include one or more of an attenuation of the channel, an effective length of the channel, an amount of inter-symbol interference in the channel, an amount of noise or interference in the channel, and the like.

The RSCCA information includes a maximum allowable interference, indicating an amount of additional interference that may be present in the channel at the location of the primary receiving device for which the primary receiving device will still be able to receive and properly decode packets from the transmitting device when the transmitting device transmits using the maximum MCS and the minimum TX power. The maximum allowable interference may be expressed as an amount of power. The maximum allowable interference may be relative to an amount of noise and interference already present in the channel.

In an embodiment, the maximum allowable interference may be adjusted according to a number of adjacent secondary transmitting devices that may perform communications during the NAV protection period in accordance with the RSCCA information. For example, the maximum allowable interference may be reduced by, for example, 6 decibels, when more than one adjacent second transmitting device may perform communications during the NAV protection period.

At S606, the primary receiving device transmits a packet including the RSCCA information. The packet including the RSCCA information may be a CTS packet, a signal (SIG) field of a data, control, or management packet, or a packet specifically adapted to carry RSCCA information.

The RSCCA information includes the maximum allowable interference. The RSCCA information may also include one or more of an indication of a transmission power used to transmit the packet, a location of the primary receiving device, and other information suitable for use in determining characteristics of a channel between the primary receiving device and another device that receives the packet including the RSCCA information.

At S608, the primary receiving device determines a CCA threshold for use during the NAV protection period according to the RSCCA information. The determined CCA threshold is sufficiently high that any transmissions having a power level at the primary receiving device below the maximum allowable interference will not cause the medium to be sensed as being busy.

In another embodiment, such as when, for example, the communications of the secondary pair are statistically unlikely to occupy the medium when the primary receiving device is sensing the energy in the medium, the primary receiving device does not alter its CCA threshold.

Figure 7:
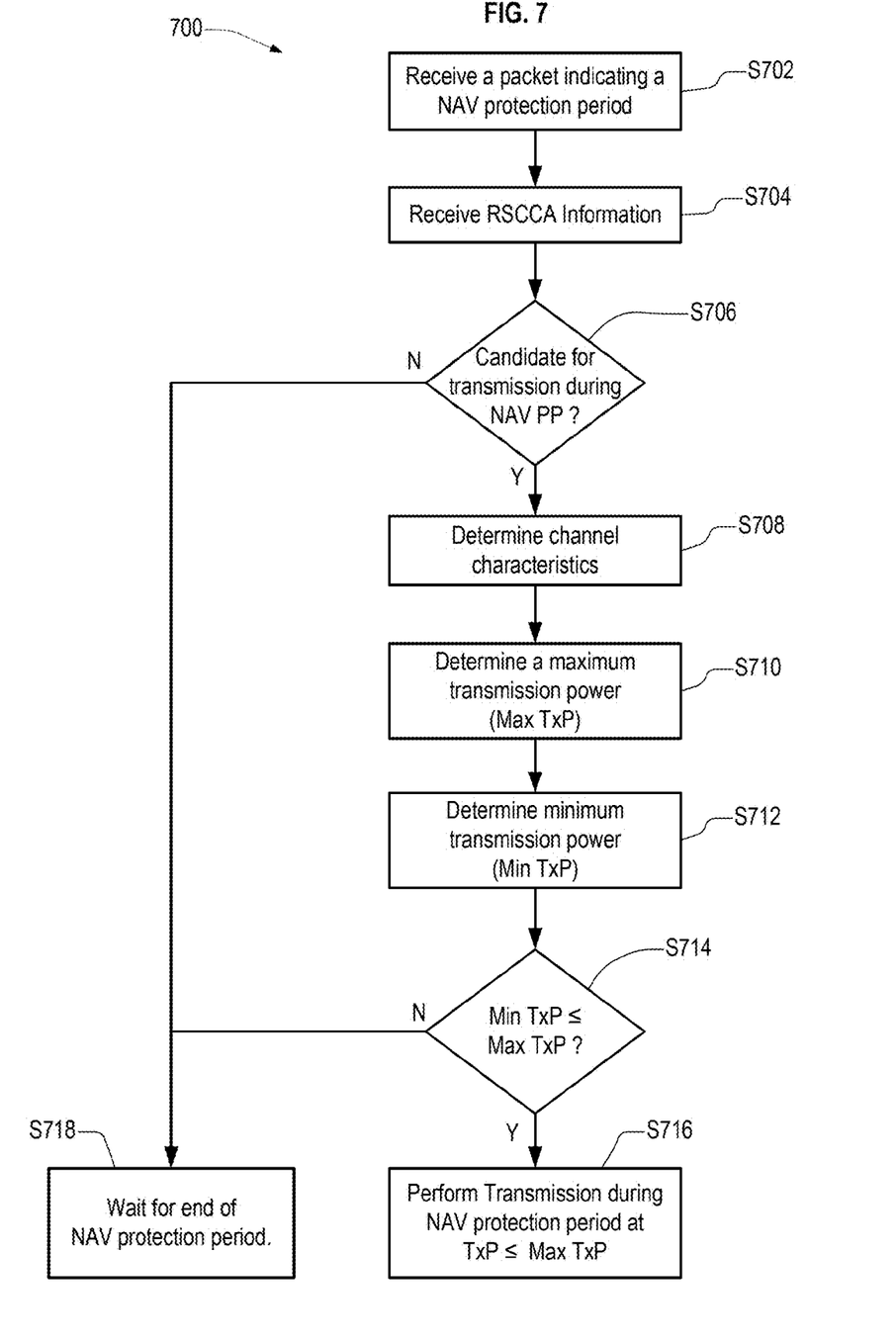
FIG. 7 illustrates a process for determining a transmission during a NAV protection period in a device not protected by the NAV.

FIG. 7 illustrates a process 700 for performing communications according to a Receive-Side Clear Channel Assessment (RSCCA) in a transmitting device not protected by a NAV vector, that is, in a secondary transmitting device of a secondary pair of devices, according to an embodiment. In an embodiment, the process 700 may be performed using software or firmware executed by the MAC processor 212 of the WLAN device 200 of FIG. 2.

At S702, the secondary transmitting device receives a packet indicating a duration of a NAV protection period. The secondary transmitting device updates a NAV of the transmitting to indicate the duration of the NAV protection period.

At S704, the secondary transmitting device receives RSCCA information. The RSCCA information may be included in the same packet that indicated the duration of the NAV protection period at S702, or may be a packet received prior the reception of the packet that indicated the duration of the NAV protection period.

The received RSCCA information includes a maximum allowable interference that a secondary transmitting device may produce at the location of a primary receiving device. In an embodiment, the RSCCA information is provided by the primary receiving device.

At S706, the secondary transmitting device determines whether it is a candidate for transmitting during the NAV protection period. The secondary transmitting device may determine that it is a candidate for transmitting during the NAV protection period when the secondary transmitting device has information queued for transmission to another device. If the secondary transmitting device is determined to be a candidate for transmitting, the process 700 proceeds to S708. Otherwise, the process 700 proceeds to S718.

In an embodiment, the secondary transmitting device may determine that it is a candidate for transmitting during the NAV protection period when transmission of the queued information will take less than a maximum amount of time. In an embodiment, the maximum amount of time may be predetermined. In another embodiment, the maximum amount of time may be determined according to the duration of the NAV protection period. For example, the maximum amount of time may be predetermined fraction of the duration of the NAV protection period.

In an embodiment, in order to reduce contention between neighboring secondary transmitting devices that may be potential candidates for transmitting during the NAV protection period, the secondary transmitting device may determine that it is a candidate for transmitting according to a probability.

For example, the secondary transmitting device may generate a number using a random number generator or a pseudo-random number generator (hereinafter collectively referred to as RNGs) and determine that the secondary transmitting device is a candidate when the generated number is less than a probability threshold.

In an embodiment, the probability threshold is predetermined. For example, the probability threshold may be configured so that the generated number has one chance in thirty-two (32) of being less than the probability threshold.

In another embodiment, the probability threshold is included in the received RSCCA information. The probability threshold may be determined according to a number of known potential secondary transmitting devices in the vicinity of the primary receiving device that generated the RSCCA information.

At S708, the secondary transmitting device determines characteristics of a channel between the secondary transmitting device and the primary receiving device.

In an embodiment, the secondary transmitting device determines an attenuation of the channel according to a received signal strength of a packet received from the secondary receiving device and a transmitted power of the received packet. In an embodiment, the transmitted power is a predetermined value.

In another embodiment, an indication of the transmitted power is included in the received packet. For example, the received packet may include the RSCCA information, and the RSCCA information may include an indication of the transmitted power. In another embodiment, the received packet used to determine the attenuation may be a prior-received sounding packet transmitted by the primary receiving device.

In another embodiment, the secondary transmitting device determines the attenuation of the channel according to locations of the secondary transmitting device and the primary receiving device. The location of the primary receiving device may be including in the RSCCA information.

In another embodiment, the attenuation of the channel may be provided to the secondary transmitting device by another device. For example, the primary receiving device may determine the attenuation of the channel using a process similar to one of the processes described above and then include the attenuation of the channel in the RSCCA information. The RSCCA information may further include an identifier associated with the secondary transmitting device that associates the attenuation with the secondary transmitting device.

In another embodiment, the characteristics of the channel may be provided to the secondary transmitting device by a network controller. For example, in an installation wherein multiple BSSs are jointly managed by a WLAN controller, the WLAN controller may determine characteristics of the channels between each station and the other stations in the vicinity of that station, and may communicate the determined characteristics to each respective station.

In an embodiment, the characteristics of the channel are determined before the beginning of the NAV protection period and are updated from time to time. In an embodiment, characteristics of the channel are updated when a change in the characteristics is detected.

At S710, the secondary transmitting device determines a maximum transmission power (Max TxP) that may be used without generating more than the maximum allowable interference at the location of the primary receiving device. The determination of the Max TxP is made according to the maximum allowable interference and the determined characteristics of the channel between secondary transmitting device and the primary receiving device.

The determination of the maximum transmission power may also use information regarding the directional properties of one or more antennas of the secondary transmitting device. In an embodiment, one or more of beam-forming, selecting a directional antenna, or steering a directional antenna may be used to reduce the amount of power transmitted towards the primary receiving device, and the value of the Max TxP may be increased accordingly.

At S712, the secondary transmitting device determines a minimum transmission power (Min TxP). In an embodiment, the Min TxP may be determined according to a minimum transmission power necessary for reliable communication with the secondary receiving device that the secondary transmitting device has information to transmit to during the NAV protection period. In an embodiment, the Min TxP may be determined according to a minimum power at which the secondary transmitting device is capable of transmitting.

At S714, the secondary transmitting device determines whether communications with the secondary receiving device can be performed without producing more than the maximum allowable interference at the location of the primary receiving device, that is, without violating restrictions imposed by the RSCCA information. The communications can be performed without violating the restrictions when the Min TxP is less than or equal to the Max TxP. If it is determined that the communications with the secondary receiving device can be performed without producing more than the maximum allowable interference, the process 700 proceeds to S716. Otherwise, the process 700 proceeds to S718.

At S716, the secondary transmitting device transmits one or more packets to the secondary receiving device during the NAV protection period when the value of the Min TxP is less than or equal to the value of the Max TxP and any other RSCCA conditions, such as the candidate selection described with reference to S706, are also satisfied.

At S718, the secondary transmitting device waits until the NAV protection period ends before making any further attempts to communication when the value of the Min TxP is greater than the value of the Max TxP or when any other RSCCA conditions, such as the candidate selection described with reference to S706, are not satisfied.

Figure 8:
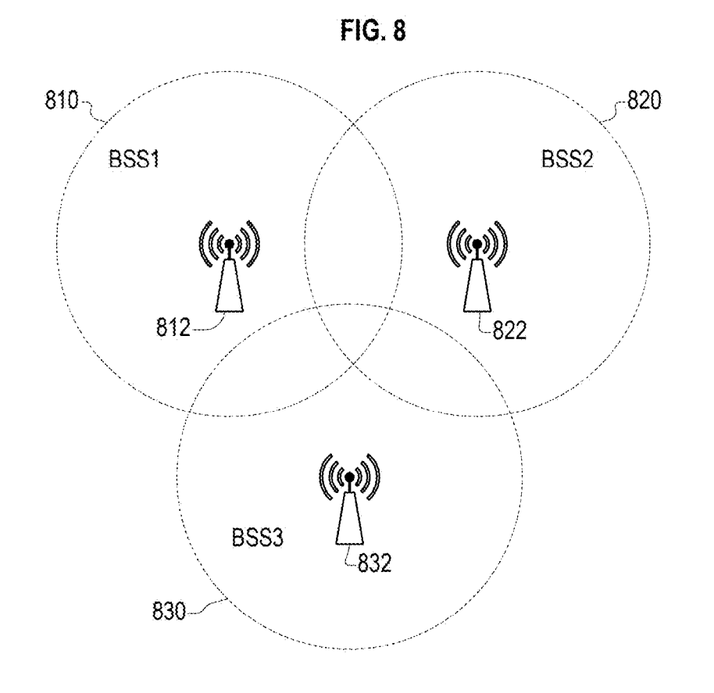
FIG. 8 illustrates a plurality of Basic Service Sets (BSSs) configured to coordinate RSCCA according to an embodiment.

FIG. 8 illustrates a wireless network including a plurality of inter-communicating BSSs having overlapping coverage areas. The BSS include a first BSS 810 (BSS1) controlled by a first AP 812, a second BSS 820 (BSS2) controlled by a second AP 822, and a third BSS 830 (BSS3) controlled by a third AP 832.

The BSSs 810 to 830 are adapted to coordinate use of RSCCA. In particular, the BSSs 810 to 830 determine which BSS will have primary pairs (that is, devices that have communications protected by a NAV protection period) and which BSSs will have secondary pairs (that is, devices that communicate according to the RSCCA) according to a time within a beacon interval, as illustrated in FIG. 8.

In an embodiment, the APs 812, 822, and 832 may coordinate the use of RSCCA by negotiating with each other using either wireless packets or communications through a wired network providing communication between the APs. In another embodiment, a WLAN controller (not shown) controls the APs 812, 822, and 832 to coordinate the use of RSCCA.

Figure 9:
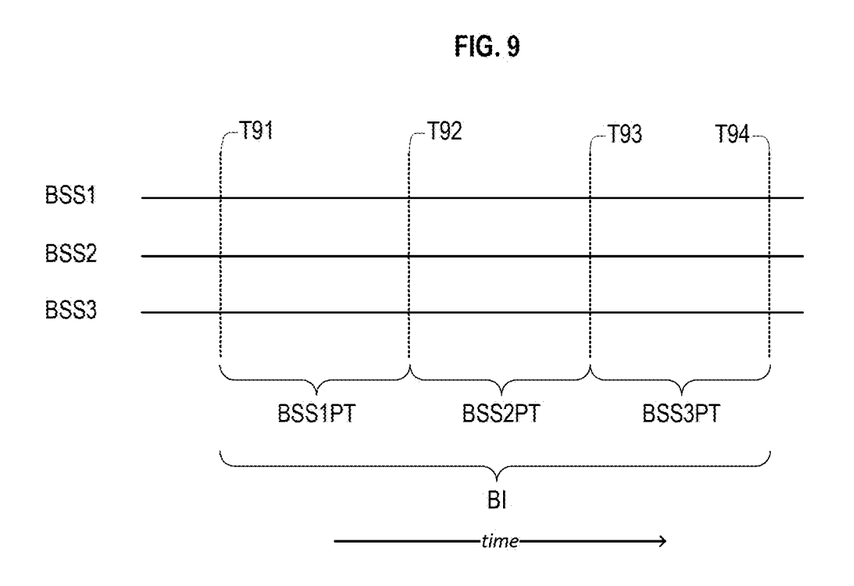
FIG. 9 illustrates an allocation of sub-intervals of a beacon interval among the BSSs of FIG. 8 according to an embodiment.

FIG. 9 shows coordination of RSCCA in a beacon interval BI according to an embodiment. Each beacon interval BI is divided into sub-intervals, each sub-interval associated with a BSS. During each sub-interval, the associated BSS establishes NAV protection periods and communicates accordingly, while the other BSS communicate according to the RSCCA information.

Thus, during a first BSS prime-time interval BSS1PT starting at a first time T91 and ending at a second time T92, the first BSS BSS1 establishes NAV protection periods and communicates accordingly, and the second and third BSSs BSS2 and BSS3 communicate as permitted by the RSCCA. During the first BSS prime-time interval BSS1PT, devices of the first BSS BSS1 may communicate at full power, while devices of the second and third BSSs BSS2 and BSS3 communicate using reduced power.

Then, during a second BSS prime-time interval BSS2PT starting at the second time T92 and ending at a third time T93, the second BSS BSS2 establishes NAV protection periods and communicates accordingly, and the first and third BSSs BSS1 and BSS3 communicate as permitted by the RSCCA. During the second BSS prime-time interval BSS2PT, devices of the second BSS BSS2 may communicate at full power, while devices of the first and third BSSs BSS1 and BSS3 may communicate using reduced power.

Finally, during a third BSS prime-time interval BSS3PT starting at the third time T93 and ending at a fourth time T94, the third BSS BSS3 establishes NAV protection periods and communicates accordingly, and the first and second BSSs BSS1 and BSS3 communicate as permitted by the RSCCA. During the third BSS prime-time interval BSS3PT, devices of the third BSS BSS3 may communicate at full power, while devices of the first and second BSSs BSS1 and BSS2 may communicate using reduced power.

In above explanations and figures, illustrative embodiments were provided to allow a person of skill in the art to understand and implement embodiments of the disclosure. However, embodiments are not limited thereto, and are therefore not limited to the number of STAs, specific identifications, specific formats, specific number of STAs per identifications, or other specifics of the illustrative embodiments. Furthermore, while in the description and related figures the reference has made to one or more IEEE Std 802.11 standards, embodiments are not limited thereto, and a person of skill in the art in light of the teachings and disclosures herein would understand how the present disclosures apply to any wireless operation that operates in licensed or unlicensed bands.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 and 110 of FIG. 4, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 4.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method for controlling access to a medium in a wireless communication system, the method comprising:
   determining, by a first device, a maximum allowable interference; and
   transmitting a packet including an indicator of the maximum allowable interference and one or more of an indication of a transmission power used to transmit the packet and an indication of a location of the first device,
   wherein the maximum allowable interference corresponds to an amount of interference that is present at the first device without preventing proper reception, by the first device, of packets from a second device, or to an amount of interference that is present at the first device without resulting in a reduction in a current Modulation and Coding Scheme (MCS) of communications between the first and second device.

2. The method of claim 1, wherein the first device is a receiving device and determining the maximum allowable interference comprises:
   determining one or more of a maximum MCS for transmissions from the second device to the first device and a minimum transmission power for the transmissions; and
   determining the maximum allowable interference according to one or more of the maximum MCS and the minimum transmission power.

3. The method of claim 1, wherein the packet further includes an indication of a duration of a Network Allocation Vector (NAV) protection period.

4. The method of claim 1, further comprising:
   receiving an indication of a maximum allowable interference by a transmitting device; and
   determining a maximum transmission power according to the maximum allowable interference.

5. The method of claim 1, further comprising:
   determining a Clear Channel Assessment (CCA) threshold according to the maximum allowable interference.

6. The method of claim 1, wherein the packet is a Clear to Send (CTS) packet.

7. The method of claim 1, wherein the first device performs the method during a first sub-interval of a beacon interval, and wherein the first device does not perform the method during a second sub-interval of the beacon interval.

8. A method for controlling access to a medium in a wireless communication system, the method comprising:
   determining, by a first device, a maximum allowable interference, and
   transmitting a packet including an indicator of the maximum allowable interference,
   wherein the maximum allowable interference corresponds to an amount of interference that is present at the first device without preventing proper reception, by the first device, of packets from a second device, or to an amount of interference that is present at the first device without resulting in a reduction in a current Modulation and Coding Scheme (MCS) of communications between the first and second device, and
   wherein the indicator of the maximum allowable interference is included in a signal (SIG) field of the packet.

9. A method for controlling access to a medium in a wireless communication system, the method comprising:
   receiving, by a secondary transmitting device, an indication of a maximum allowable interference;
   determining a maximum transmission power according to the maximum allowable interference;
   receiving an indication of a duration of a Network Allocation Vector (NAV) protection period; and
   transmitting packets during the NAV protection period at a transmission power less than or equal to the maximum transmission power,
   wherein the maximum allowable interference corresponds to an amount of interference that is present at a primary receiving device without preventing proper reception, by the primary receiving device, of packets from a primary transmitting device, or to an amount of interference that is present at the primary receiving device without resulting in a reduction in a current Modulation and Coding Scheme (MCS) of communications between the primary transmitting device and primary receiving device, and
   wherein the NAV protection period does not reserve the medium for use by the secondary transmitting device.

10. The method of claim 9, wherein the indication of a maximum allowable interference is received in a packet transmitted by the primary receiving device.

11. The method of claim 10, wherein the packet is a Clear-to-Send (CTS) packet.

12. The method of claim 10, further including transmitting a cross-Ready-to-Send (XRTS) packet to a secondary receiving device after receiving the packet transmitted by the primary receiving device,
   wherein the XRTS packet includes an indication of a time of a RTS/CTS exchange of the primary receiving device and an indication of a duration of a Network Allocation Vector (NAV) protection period.

13. The method of claim 12, further including performing communications with the secondary receiving device when a cross-Clear-To-Send (XCTS) packet has been received from the secondary receiving device.

14. The method of claim 9, wherein determining the maximum transmission power comprises:
   determining one or more characteristics of a channel between the secondary transmitting device and the primary receiving device; and
   determining the maximum transmission power at which a packet transmitted at the maximum transmission power has a power level after propagating through the channel that is less than or equal to the maximum allowable interference.

15. The method of claim 14, wherein determining the one or more characteristics of the channel includes determining an attenuation of the channel according to one or more of a distance between the transmitting the device and the primary receiving device, a transmission power of a packet transmitted by the primary receiving device, and a measurement of a power level of the packet transmitted by the primary receiving device.

16. The method of claim 9, further comprising:
   determining a minimum transmission power for communicating with a secondary receiving device; and
   determining whether to perform communications with the secondary receiving device according to a comparison of the minimum transmission power and the maximum transmission power.

17. The method of claim 9, further comprising determining whether to perform communications according to a comparison of a number generated by a random or pseudo-random number generator with a threshold.

* * * * *